(12) United States Patent
Koeske et al.

(10) Patent No.: US 6,250,613 B1
(45) Date of Patent: Jun. 26, 2001

(54) NON-METALLIC SPACER FOR AIR SPRING ASSEMBLY

(75) Inventors: Paul P. Koeske, Fishers; Mohamad Taghizadeh, Indianapolis; Pradipta N. Moulik, Carmel; Todd M. Ziems, Granger; Andreas Peickert, South Bend, all of IN (US)

(73) Assignee: Bridgestone/Firestone, Inc., Arkon, OH (US)

( * ) Notice: Subject to any disclaimer, the term of this patent is extended or adjusted under 35 U.S.C. 154(b) by 0 days.

(21) Appl. No.: 09/281,375

(22) Filed: Mar. 30, 1999

(51) Int. Cl.$^7$ .................................................. B06G 25/00
(52) U.S. Cl. .............................. 267/66; 267/35; 267/122; 267/153; 267/292
(58) Field of Search .............................. 267/153, 66, 35, 267/64.27, 201, 214, 219, 292, 122; 248/634, 635, 56; 411/531, 533, 535; 249/211, 216, 183; 280/124.116, 124.128, 124.158

(56) References Cited

U.S. PATENT DOCUMENTS

| | | | |
|---|---|---|---|
| 2,689,146 | * | 9/1954 | Werner .................................. 411/531 |
| 3,420,491 | * | 1/1969 | Bowden et al. ...................... 249/183 |
| 3,469,817 | * | 9/1969 | Bowden et al. ...................... 249/183 |
| 3,632,003 | * | 1/1972 | De Simone ............................ 215/21 |
| 5,535,994 | * | 7/1996 | Safreed, Jr. ........................ 267/64.27 |
| 5,954,316 | * | 9/1999 | Voss ................................... 267/64.27 |
| 5,954,351 | * | 9/1999 | Koschinat ..................... 280/124.116 |

FOREIGN PATENT DOCUMENTS

| | | |
|---|---|---|
| 42 13 676 A 1 | 10/1993 | (DE) . |
| 296 16 257 U1 | 12/1996 | (DE) . |
| 196 16 476 A 1 | 11/1997 | (DE) . |
| 0 160 371 | 3/1985 | (EP) . |
| 0 295 392 | 4/1988 | (EP) . |
| 0 296 445 | 6/1988 | (EP) . |

* cited by examiner

Primary Examiner—Robert J. Oberleitner
Assistant Examiner—Thomas J. Williams
(74) Attorney, Agent, or Firm—Michael Sand; Thomas R. Kingsbury; John H. Hornickel

(57) ABSTRACT

A spacer for an air spring assembly includes a substantially cylindrical body having a substantially planar mounting surface. The body includes a central hub, an outer rim, and a plurality of structural arms connecting the outer rim to the central hub. The central hub includes a pair of concentric hub walls with a plurality of spoke ribs disposed between the hub walls. The outer rim includes an annular groove in its upper surface as well as a plurality of support ribs. Each of the structural arms has a T-shaped cross section. The spacer has five bolt holes that are configured to work with a single center mount, two point, three point, or a four point mounting pattern. The spacer is fabricated from a non-metallic material such as a high strength, lightweight plastic or fiber reinforced plastic.

26 Claims, 5 Drawing Sheets

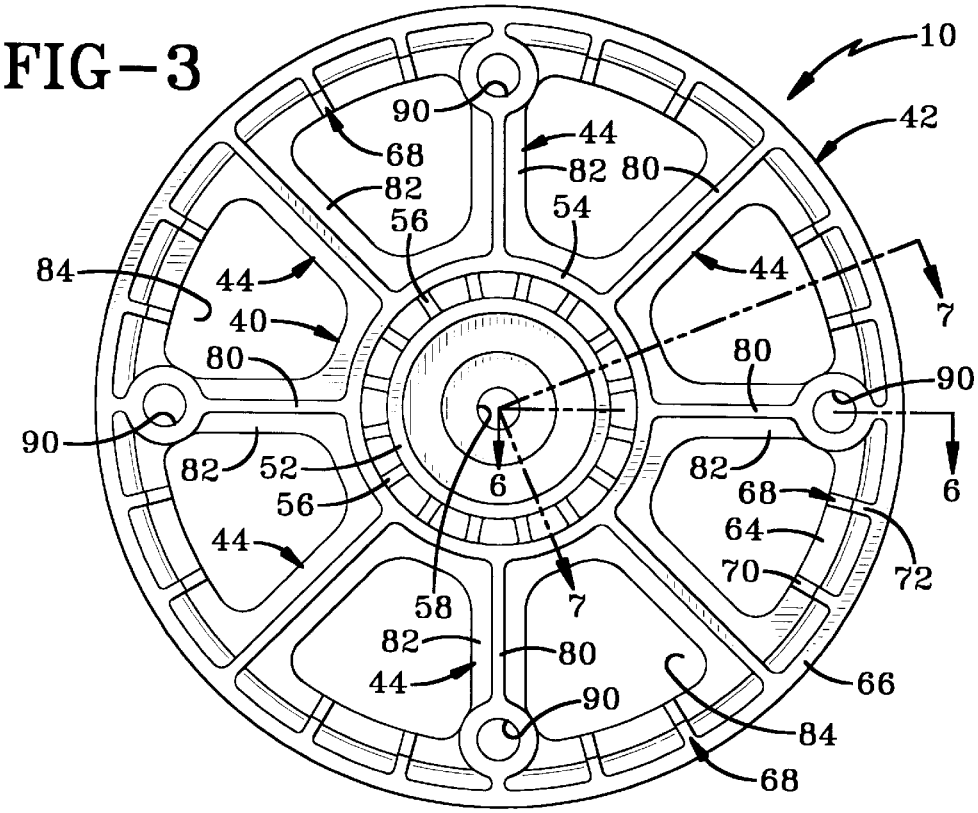
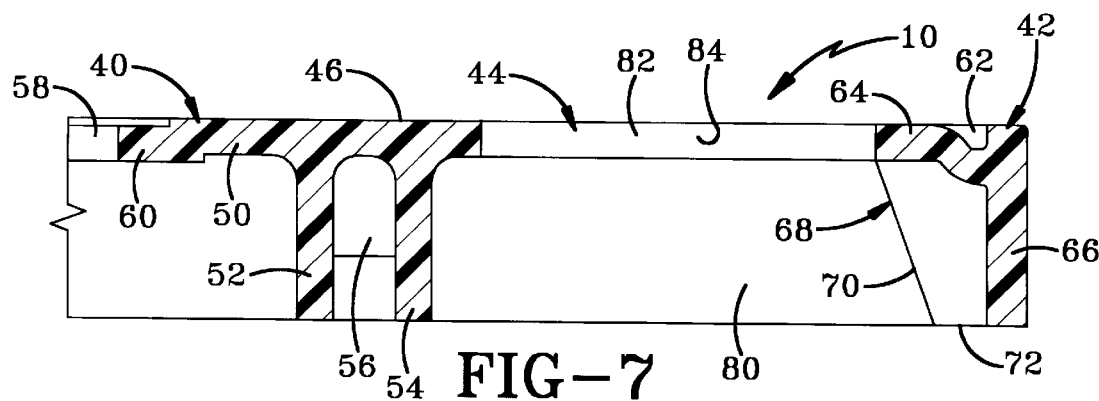

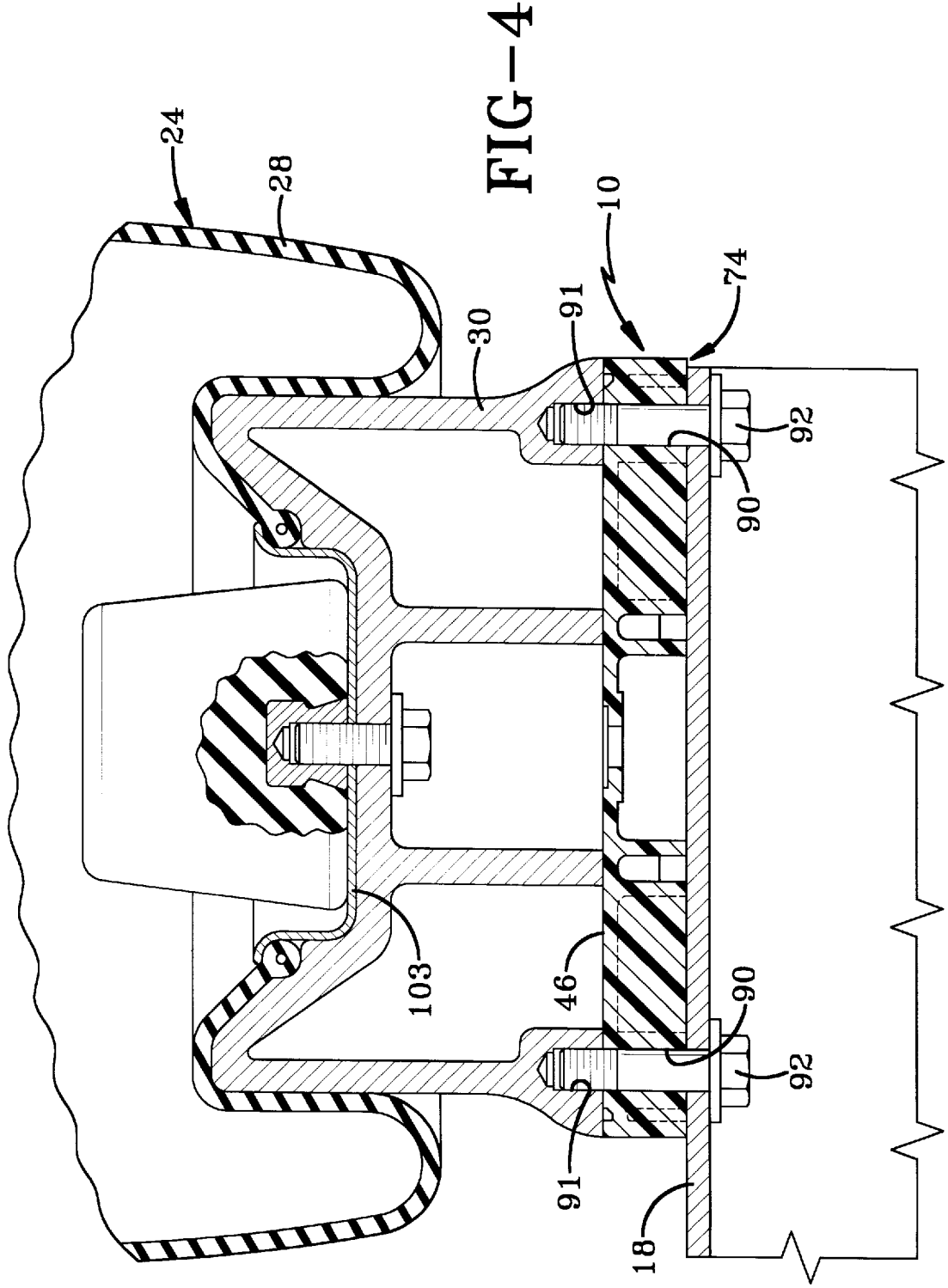

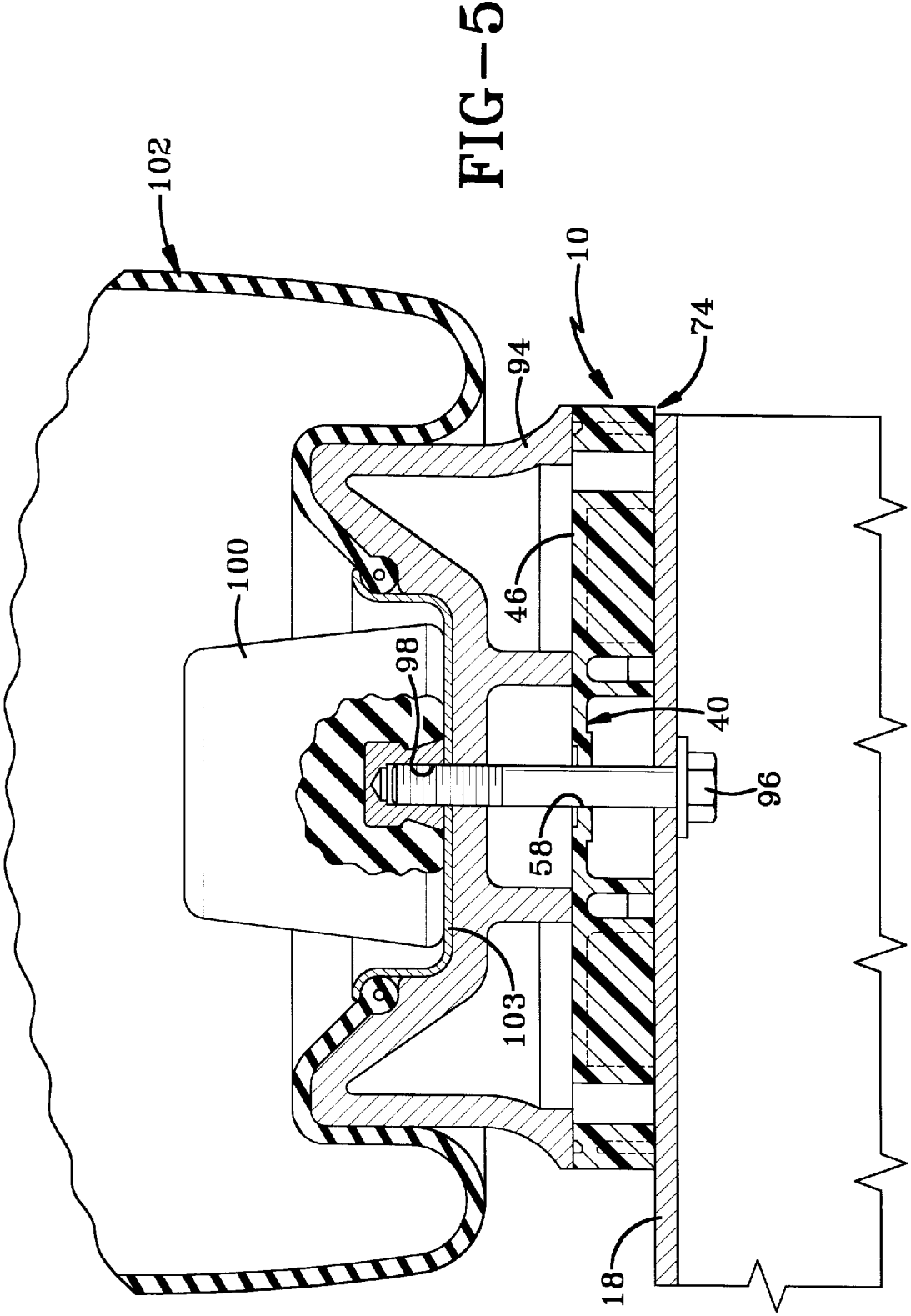

NON-METALLIC SPACER FOR AIR SPRING ASSEMBLY

BACKGROUND OF THE INVENTION

1. Technical Field

This invention generally relates to air spring assemblies and, more particularly, to a spacer for the piston or bead plate of an air spring assembly. Specifically, the invention relates to a non-metallic spacer for the piston or bead plate of an air spring assembly with the spacer having structure that provides strength in a variety of mounting configurations and a hole pattern that accepts a variety of air spring assemblies.

2. Background Information

Pneumatic assemblies such as air actuators and springs have been used for many years for various purposes. The air actuator usually includes a flexible rubber sleeve or bellows containing a supply of pressurized fluid and a feed for increasing or decreasing the pressurized fluid therein. The flexible sleeve is formed of a flexible elastomeric material often containing reinforcing cords, where the flexibility of the material permits a first end cap to move axially with respect to another end cap secured within the ends of the sleeve as the amount of pressurized fluid is changed. When the air actuator is positioned between a movable or actuatable object and typically a fixed object, the movable object moves in correlation to the axial movement of the end caps.

As to pneumatic springs, commonly referred to as air springs, the construction is similar with a flexible rubber sleeve or bellows containing a supply of a pressurized fluid. The air spring is different in that it has one or more pistons movable with respect to the flexible sleeve. The piston causes compression and expansion of the fluid within the sleeve as the sleeve stretches or retracts, respectively, thereby absorbing shock loads and/or dampening vibrations. The flexible sleeve is formed of a flexible elastomeric material that typically contains reinforcing cords. The structure of the sleeve permits the piston to move axially with respect to another piston or end cap secured at the other end of the sleeve. One application for such air springs is with motor vehicles where the spring provides cushioning between movable parts of the vehicle, primarily to absorb shock loads impressed on the vehicle axles by the wheel striking an object in the road or falling into a depression.

One problem with air spring assemblies is that they must be provided in a wide variety of shapes and sizes to fit the numerous suspension system configurations that are known in the art. As such, the air spring manufacturer is forced to provide each air spring configuration in a variety of heights and diameters so that each suspension application falls within the design envelope of at least one air spring assembly. It is thus desired in the art to provide spacers that may be combined with air spring assemblies to expand the design envelope of the air spring assemblies. Spacers allow the design height, minimum height, maximum height, and stroke of an air spring assembly to be easily modified. The spacers thus allow the manufacturer to decrease the total number of air spring configurations in its inventory and manufacturing line. It is thus desired in the art to provide an improved spacer for an air spring assembly that performs these functions.

Prior art spacers have been fabricated from a metal that is typically aluminum or steel. One problem of fabricating spacers from metal is the overall expense associated with casting or forming the metal spacer. Another problem is the weight of the metal spacers. A further problem is that the spacers are subject to harsh environmental conditions that lead to corrosion of metal spacers. It is thus desired in the art to provide a lightweight, non-corrosive spacer.

A problem in the art with manufacturing spacers for air spring assemblies out of lightweight non-corrosive materials such as plastic is that the spacers are subjected to significant forces during use. The spacers also must be designed with a safety factor because they are used in vehicle suspensions. A specific problem related to the strength of the spacer occurs in partial-beam mounting arrangements where the spacer is not entirely supported by a suspension member such as when the spacer extends out over the edge of a suspension member. It is thus desired in the art to provide a non-metallic spacer that is strong enough to withstand the operating environments of an air spring assembly.

SUMMARY OF THE INVENTION

In view of the foregoing, it is an objective of the present invention to provide an improved spacer for an air spring assembly.

Another objective of the present invention is to provide a spacer for an air spring assembly that is fabricated from a non-metallic material such as plastic or fiber-reinforced plastic.

Another objective of the present invention is to provide a spacer for an air spring assembly that is fabricated from a substantially non-corrosive material.

Another objective of the present invention is to provide a non-metallic spacer for an air spring assembly that has a hole pattern that cooperates with a variety of piston mounting patterns such as a single center mount, two-point, a three-point, or a four-point mounting pattern.

Another objective of the present invention is to provide a non-metallic spacer for an air spring assembly having a plurality of structural support beams that provide support while minimizing the amount of material used to form the spacer.

Another objective of the present invention is to provide a non-metallic spacer for an air spring assembly having a continuous surface interruption adjacent its outer diameter that eliminates or minimizes warping or oil canning to maximize contact between the air spring assembly and the piston.

Another objective of the present invention is to provide a non-metallic spacer for an air spring assembly that can be mounted in a fully-extending beam or partial-beam mounting arrangement.

Another objective of the present invention is to provide a non-metallic spacer for an air spring assembly having perimeter ribs that provide support at the edges of the spacer when the spacer is mounted in a partial-beam mounting.

Another objective of the present invention is to provide a non-metallic spacer for an air spring assembly that may be stacked with additional spacers to increase the effective height of the spacer.

Another objective of the present invention is to provide a non-metallic spacer for an air spring assembly that is relatively easy and inexpensive to manufacture.

These and other objectives and advantages of the invention are achieved by a spacer for an air spring assembly including a substantially cylindrical body having a substantially planar mounting surface; the body including a central hub, an outer rim, and a plurality of structural arms connecting the outer rim to the central hub.

Other objectives and advantages of the invention are achieved by an improved spacer for an air spring assembly, the spacer having a body with a substantially planar mounting surface and a substantially cylindrical sidewall; the improvement being that the body is fabricated from a nonmetallic material.

BRIEF DESCRIPTION OF THE DRAWINGS

A preferred embodiment of the invention, illustrative of the best mode in which applicants have contemplated applying the principles of the invention, is set forth in the following description and is shown in the drawings and is particularly and distinctly pointed out and set forth in the appended claims.

FIG. 3 is a bottom plan view of the spacer;

FIG. 4 is a fragmentary sectional side view taken along line 4—4 of FIG. 2;

FIG. 5 is a view similar to FIG. 4 showing a single center mount configuration;

FIG. 6 is an enlarged fragmentary sectional view taken along line 6—6 of FIG. 3; and FIG. 7 is an enlarged fragmentary sectional view taken along line 7—7 of FIG. 3.

Similar numerals refer to similar parts throughout the drawings.

DESCRIPTION OF THE PREFERRED EMBODIMENT

The spacer of the present invention is indicated generally by the numeral 10 in the accompanying drawings. Spacer 10 is fabricated from a non-metallic material. In the preferred embodiment of the present invention, spacer 10 is fabricated from a plastic and, more particularly, a fiber-reinforced plastic. Fabricating spacer 10 from a non-metallic material such as fiber-reinforced plastic, allows spacer 10 to be lightweight, relatively inexpensive and easy to manufacture, and substantially resistant to corrosive materials that are encountered by spacer 10 in its normal working environment. The structure of spacer 10 also ensures that spacer 10 is strong enough to withstand the forces encountered in its working environment.

Figure 1:
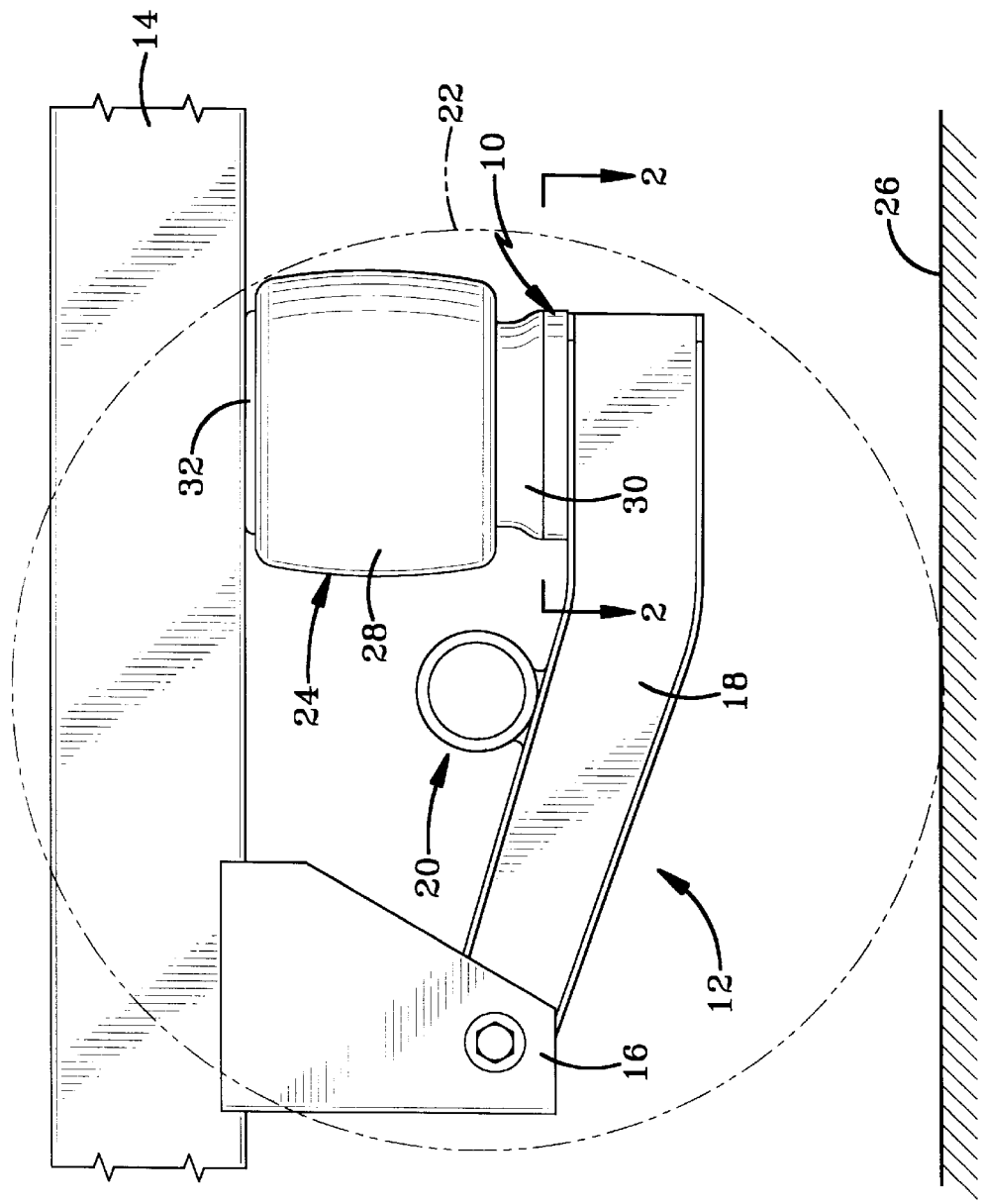
FIG. 1 is a side elevational view of a suspension assembly mounted to a frame member on a vehicle incorporating an air spring assembly mounted with the spacer of the present invention.

One example of the working environment of spacer 10 is depicted in FIG. 1. This working environment is a suspension assembly 12 that is mounted to a frame member 14 of a vehicle such as a tractor trailer. Suspension assembly 12 may include a bracket 16 and a suspension member 18 such as a trailing arm. Suspension member 18 is typically movably mounted to bracket 16 or to frame member 14. An axle assembly 20 is mounted to suspension member 18 and is thus movable with respect to frame member 14. The outline of a wheel 22 of the vehicle is depicted in dash lines in FIG. 1.

Suspension member 18 is further connected to frame member 14 by an air spring assembly 24. Air spring assembly 24 absorbs forces that are transmitted to suspension member 18 by wheel 22 when wheel 22 encounters irregularities in the road surface 26. In the embodiment depicted in FIG. 1, axle assembly 20 is disposed between bracket 16 and air spring assembly 24. In other embodiments, axle assembly 20 may be located in different positions. In accordance with one of the objectives of the present invention, spacer 10 is used to mount air spring assembly 24 to suspension member 18 to provide for the correct spacing of the air spring between frame 14 and trailing arm 18.

Air spring assembly 24 includes a bellows 28 that extends between a piston 30 and a bead plate 32. Bellows 28 forms a selectively sealed cavity that receives a compressible or pressurized fluid such as air. It is thus understood in the art that air spring assembly 24 absorbs significant forces transmitted to suspension member 18 by axle assembly 20. It is thus important that spacer 10 be configured and designed to withstand these forces in a variety of mounting configurations and when used with a variety of air spring assemblies 24.

In accordance with one of the objectives of the present invention, spacer 10 is configured to withstand the significant forces experienced in its working environment. To this end, spacer 10 (FIGS. 2 and 3) includes a center hub 40, an outer rim 42, and a plurality of structural arms 44 connecting outer rim 42 to central hub 40. In the preferred embodiment of the present invention depicted in the drawings, each structural arm 44 is radially disposed with respect to central hub 40 and outer rim 42. In other embodiments of the present invention, structural arms 44 may be disposed in other arrangements with respect to central hub 40 and outer rim 42. For instance, each structural arm 44 may be substantially perpendicular to the other structural arms 44 with each structural arm 44 being substantially tangentially disposed with respect to central hub 40.

Spacer 10 has a substantially planar top mounting surface 46 formed by the cooperation of the top surface of central hub 40, outer rim 42, and each structural arm 44. For the remaining description and claims of this specification, the direction "upper" or "top" refers to the side of spacer 10 that is intended to be connected with air spring assembly 24 regardless of the actual orientation of spacer 10 with respect to road surface 26.

Central hub 40 includes a top wall 50 and a pair of spaced, concentric hub walls 52 and 54. Each hub wall 52 and 54 is substantially perpendicular to top wall 50 and is integrally formed therewith. In the preferred embodiment of the present invention, each hub wall 52 and 54 has a height that is substantially equal to the height of the body of spacer 10. A plurality of spoke ribs 56 extend between hub walls 52 and 54 to provide additional strength to spacer 10. Each spoke rib may be radially disposed with respect to central hub 40. Each spoke rib 56 further has a height that is substantially less than the height of the body of spacer 10. As such, each spoke rib 56 does not extend the full length of hub walls 52 and 54. In the preferred embodiment of the present invention, each spoke rib 56 is connected to top wall 50 and thus does not extend to the bottom surface of spacer 10. In the embodiment of spacer 10 depicted in the drawings, sixteen spoke ribs 56 are positioned between hub walls 52 and 54 to provide rigidity and strength to spacer 10. In other embodiments of the present invention, different numbers of spoke ribs 56 may be used without departing from the concepts of the present invention.

Central hub 40 further includes a central mounting hole 58 that is centrally positioned within central hub 40. An inset area 60 extends about central mounting hole 58.

In accordance with another of the objectives of the present invention, outer rim 42 includes an annular groove 62 formed in a substantially horizontal top wall 64 of outer rim 42. Outer rim 42 further includes a substantially vertical sidewall 66 that forms the outer perimeter of spacer 10. As seen in FIGS. 6–7, groove 62 is inset radially from sidewall 66. In the preferred embodiment of the present invention, groove 62 is inset a distance substantially equal to the thickness of sidewall 66. Groove 62 is also formed and configured to maintain a substantially constant wall thickness at the transition between each structural arm 44 and outer rim 42. Groove 62 also maintains a substantially constant wall thickness in outer rim 42. Groove 62 prevents spacer 10 from warping or oil canning and maximizes contact between piston 18 and spacer 10. In embodiments of the invention that use fiber reinforced plastic, groove 62 further functions to redirect the fibers in outer rim 42 to increase the strength of spacer 10.

A plurality of support ribs 68 are also formed on outer rim 42 (FIG. 3). Each support rib 68 includes an inwardly facing angled surface 70 that extends down from top wall 64 to the bottom surface of spacer 10. Rib 68 then includes a substantially horizontal lower surface 72 that connects angled surface 70 to sidewall 66. In the preferred embodiment of the present invention, a pair of support ribs 68 are positioned between each pair of structural arms 44 as shown in FIG. 3.

Figure 2:
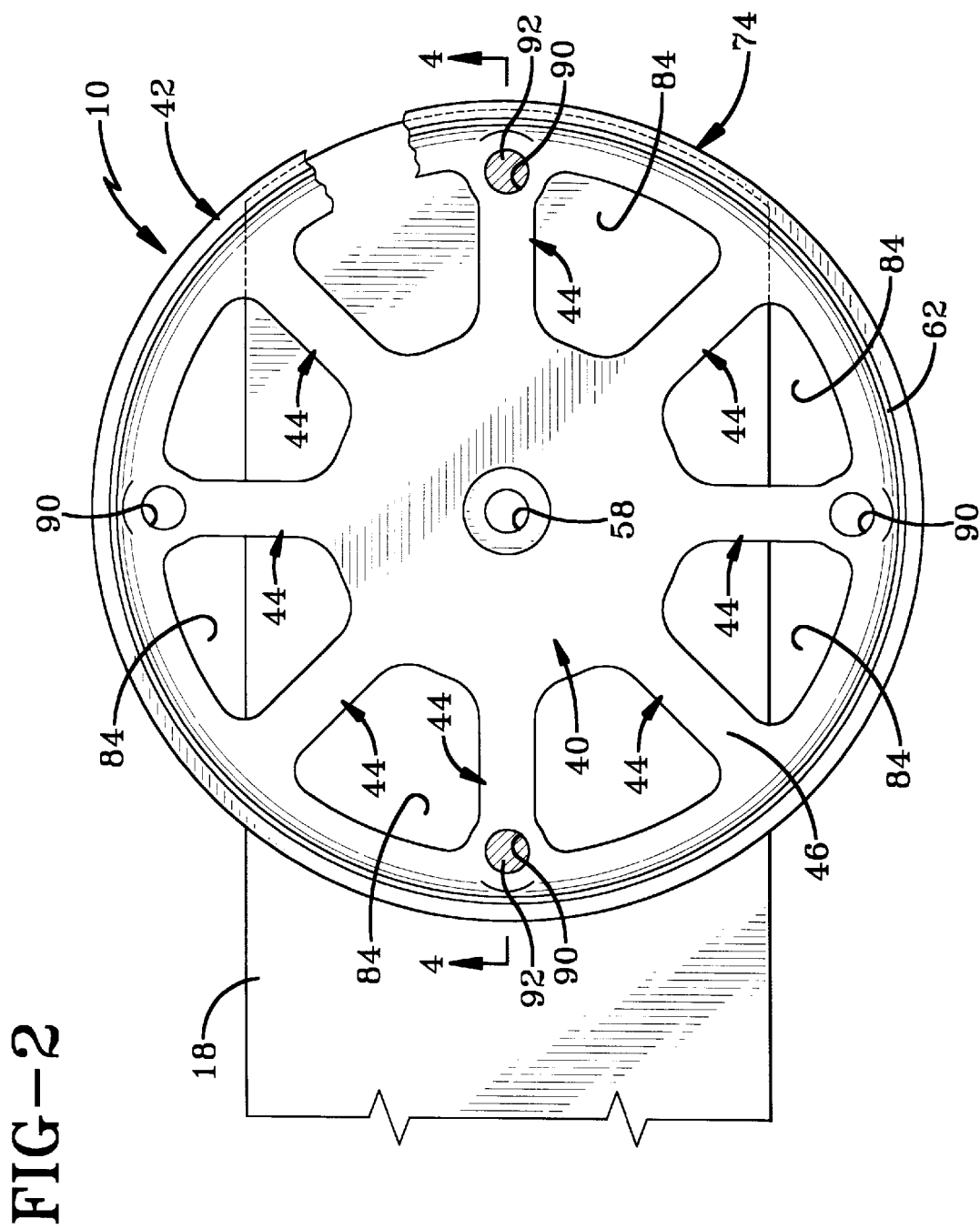
FIG. 2 is a top plan view of the spacer with portions broken away taken along line 2—2 of FIG. 1.

The configuration of outer rim 42 is particularly important when spacer 10 is mounted in a partial beam mounting configuration as depicted in the drawings. In this type of configuration, portions of spacer 10 extend out over suspension member 18 such as at the sides as depicted in FIG. 2 and at the end as indicated by the numeral 74 in FIGS. 2, 4, and 5. Overhangs such as at numeral 74 are known to create relatively large stresses, strains and other forces in spacer 10. It is thus an important function of outer rim 42 to anticipate these forces and to be constructed to withstand such forces.

Each structural arm 44 has a substantially T-shaped cross section with the cross section having a substantially vertical leg 80 and a substantially horizontal top wall 82. Top walls 82 are sized and configured to provide openings 84 between each pair of structural arms 44. Openings 84 allow less material to be used when fabricating spacer 10.

Each top wall 82 is substantially planar with top wall 50 and top wall 64. Each vertical leg 80 has substantially the same height as the height of the body of spacer 10. Each vertical leg 80 extends entirely between outer hub wall 54 and outer rim 42. In the preferred embodiment of the present invention, there are eight structural arms 44 extending radially out from central hub 40 to outer rim 42.

The body of spacer 10 further includes four mounting holes 90 that are equally spaced about spacer 10. In the preferred embodiment of the present invention, each mounting hole 90 is formed at a juncture of structural arm 44 and outer rim 42 such that the two elements cooperate to define hole 90. Each mounting hole 90 is thus adjacent to the perimeter of spacer 10.

FIG. 4 depicts the use of spacer 10 to mount piston 30 using at least a pair of mounting bolts 92 that are threadably received in a threaded hole 91 formed in piston 30 with mounting bolts 92 slidably extending through mounting holes 90. The head of each bolt 92 engages suspension member 18 to clamp spacer 10 between piston 30 and suspension member 18. As depicted in the drawings, it is preferred that the outer diameter of spacer 10 substantially matches the outer diameter of the lower end of piston 30. However, as is also shown in the drawings, it is not necessary that the entire diameter of spacer 10 be supported by suspension member 18 because spacer 10 is strong enough to withstand the forces transferred from suspension member 18 to air spring assembly 24.

An alternative mounting configuration is depicted in FIG. 5 with a different piston 94. Piston 94 is mounted to suspension member 18 by a single mounting bolt 96 that passes through central mounting hole 58 in central hub 40. Mounting bolt 96 is threadably engaged in a threaded hole 98 of a bumper stud 100 that is disposed within the air spring assembly 102 on a clamp plate 103.

Accordingly, the improved non-metallic spacer for an air spring assembly is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved non-metallic spacer for air spring assembly is construed and used, the characteristics of the construction, and the advantageous, new and useful results obtained; the new and useful structures, devices, elements, arrangements, parts and combinations, are set forth in the appended claims.

What is claimed is:

1. In combination, an air spring having a pair of end members and a spacer adapted to mount the air spring between spaced apart structures, at least one of said structures being movable, said combination comprising:

a flexible sleeve extending between and sealingly connected to said end members and forming a fluid chamber therebetween for containing a pressurized fluid;

said spacer being formed as a rigid one piece non metallic member having a generally cylindrical body with spaced substantially planar end mounting surfaces, one end member of said air spring being mounted on one of said planar end mounting surfaces of said spacer with the other of said planar end mounting surfaces being adapted to be mounted on one of the structures;

said spacer having a central hub, an outer rim and a plurality of structural arms connecting the outer rim to the central hub, each of the structural arms having a T-shaped cross section with a substantially vertical leg and a substantially horizontal top wall and having a height substantially equal to an axial height of the cylindrical body; and at least one mounting hole formed in each of the said spacer and said one end member, said holes being aligned with each other for receiving at least one common fastener for mounting the spacer and air spring on said one of the structures.

2. The combination defined in claim 1 wherein the central hub includes a top wall and a pair of spaced concentric hub walls connected to the top wall and a plurality of spoke ribs disposed between the concentric hub walls.

3. In combination, an air spring having a pair of end members and a spacer adapted to mount the air spring having a pair of end members and a spacer adapted to mount the air spring between spaced apart structures, at least one of said structures being movable, said combination comprising:

a flexible sleeve extending between and sealingly connected to said end members and forming a fluid chamber therebetween for containing a pressurized fluid;

said spacer being formed as a rigid one piece non metallic member having a generally cylindrical body with spaced substantially planar end mounting surfaces, one end member of said air spring being mounted on one of said planar end mounting surfaces of said spacer with the other of said planar end mounting surfaces being adapted to be mounted on one of the structures;

said spacer having a central hub, an outer rim and a plurality of structural arms connecting the outer rim to the central hub, said central hub having a top wall and a pair of spaced concentric hub walls connected to the top wall and a plurality of spoke ribs disposed between the concentric hub walls; and at least one mounting hole formed in each of the said spacer and said one end member, said holes being aligned with each other for receiving at least one common fastener for mounting the spacer and air spring on said one of the structures.

4. The combination defined in claim 3 wherein the body of the spacer has a height and each of the hub walls of the central hub has a height substantially equal to the height of the body; and in which the height of each spoke rib is less the height of the body.

5. The combination defined in claim 3 in which there are at least two equally spaced structural arms which cooperate with the outer rim to define at least two equally spaced mounting holes; in which at least two mounting holes are formed on the said one end member and align with the said two holes formed in the spacer; and in which two fasteners extend into said aligned holes to secure said spacer to said end member.

6. The combination defined in claim 5 in which the holes formed in the said one end member are internally threaded; and in which the fasteners are bolts which are threadably received in said internally threaded holes.

7. A spacer for an air spring assembly comprising:

a substantially cylindrical body having a substantially planar mounting surface and an axial height; the body including a central hub, an outer rim, and a plurality of structural arms connecting the outer rim to the central hub, said arms having a T-shaped cross section with the cross section having a substantially vertical leg and a substantially horizontal top wall, each of said structural arms having a height substantially equal to the axial height of the body.

8. The spacer of claim 7, wherein the body is fabricated from a nonmetallic material.

9. The spacer of claim 8, wherein the nonmetallic material is a plastic.

10. The spacer of claim 7, wherein there are eight equally-spaced radially-disposed structural arms.

11. The spacer of claim 10, wherein four of the structural arms cooperate with the outer rim to define four equally-spaced mounting holes.

12. The spacer of claim 11, wherein the central hub is formed with a central mounting hole.

13. The spacer of claim 7, wherein the outer rim has an annular groove formed in the planar mounting surface.

14. The spacer of claim 13, wherein the outer rim includes a substantially vertical sidewall having a thickness and a substantially horizontal top wall; and in which the annular groove is formed in the top wall and inset radially from the perimeter of the body by the thickness of the sidewall.

15. The spacer of claim 14, further comprising a plurality of support ribs extending between the sidewall and the top wall of the outer rim.

16. The spacer of claim 7, wherein the central hub includes a top wall and a pair of spaced, concentric hub walls connected to the top wall.

17. The spacer of claim 16, further comprising a plurality of spoke ribs disposed between the concentric hub walls.

18. The spacer of claim 17, wherein the body of the spacer has a height; in which each of the hub walls has a height substantially equal to the height of the body; and in which the height of each spoke rib is less the height of the body.

19. The spacer of claim 7, in combination with an air spring assembly, wherein the air spring assembly is connected to the spacer with at least one bolt.

20. The spacer of claim 19, wherein the air spring assembly is connected to the spacer with a pair of bolts.

21. The spacer of claim 19, in further combination with a suspension member, wherein the spacer is mounted on the suspension member and the air spring assembly is connected to the spacer.

22. The spacer of claim 21, wherein the spacer extends over at least one edge of the suspension member.

23. A spacer for an air spring assembly comprising:

a substantially cylindrical body having a substantially planar mounting surface; the body including a central hub, an outer rim, and a plurality of structural arms connecting the outer rim to the central hub, said outer rim having a substantially vertical sidewall with a thickness and a substantially horizontal top wall, an annular groove formed in the planar mounting surface and the top wall and inset radially from the perimeter of the body by the thickness of the sidewall; and a plurality of support ribs extending between the sidewall and the top wall of the outer rim.

24. A spacer for an air spring assembly comprising:

a substantially cylindrical body having a height and a substantially planar mounting surface; the body including a central hub, an outer rim, and a plurality of structural arms connecting the outer rim to the central hub, said central hub having a top wall and a pair of spaced concentric hub walls connected to the top wall; and a plurality of spoke ribs disposed between the concentric hub walls, wherein each of the hub walls has a height substantially equal to the height of the body and each of the spoke ribs having a height less the height of the body.

25. The spacer of claim 24, wherein each of the structural arms has a T-shaped cross section with the cross section having a substantially vertical leg and a substantially horizontal top wall.

26. The spacer of claim 25, wherein the body has an axial height; and in which each structural arms has a height substantially equal to the height of the body.

* * * * *